United States Patent [19]
Kabenjian

[11] Patent Number: 5,682,509
[45] Date of Patent: Oct. 28, 1997

[54] IMPROVED BUS INTERFACE TO A RAID ARCHITECTURE

[75] Inventor: Gregory V. Kabenjian, Duarte, Calif.

[73] Assignee: AST Research, Inc., Irvine, Calif.

[21] Appl. No.: 571,386

[22] Filed: Dec. 13, 1995

[51] Int. Cl.$^6$ .............................. G06F 13/00; G06F 11/10
[52] U.S. Cl. ..................... 395/309; 395/182.03; 395/275; 395/292; 395/250; 395/404
[58] Field of Search ............................. 395/309, 182.03, 395/275, 292, 250, 404

[56] References Cited

U.S. PATENT DOCUMENTS 5,479,653 12/1995 Jones .
5,535,340 7/1996 Bell et al. .
5,586,268 12/1996 Chen et al. .

Primary Examiner—Jack B. Harvey
Assistant Examiner—Rupal D. Dharia
Attorney, Agent, or Firm—Knobbe, Martens, Olson & Bear, LLP

[57] ABSTRACT

A file server system provides increased bandwidth between a processor, a memory and a redundant array of inexpensive disks (RAID). The file server includes a processor connected to a processor bus. A first bridging circuit couples the processor bus to a peripheral bus. An array of disks is controlled by at least one disk controller. The disk controller is coupled to a local RAID bus. A second bridging circuit couples the local RAID bus to the processor bus independent of the first bridging circuit.

12 Claims, 13 Drawing Sheets

FIG. 4B
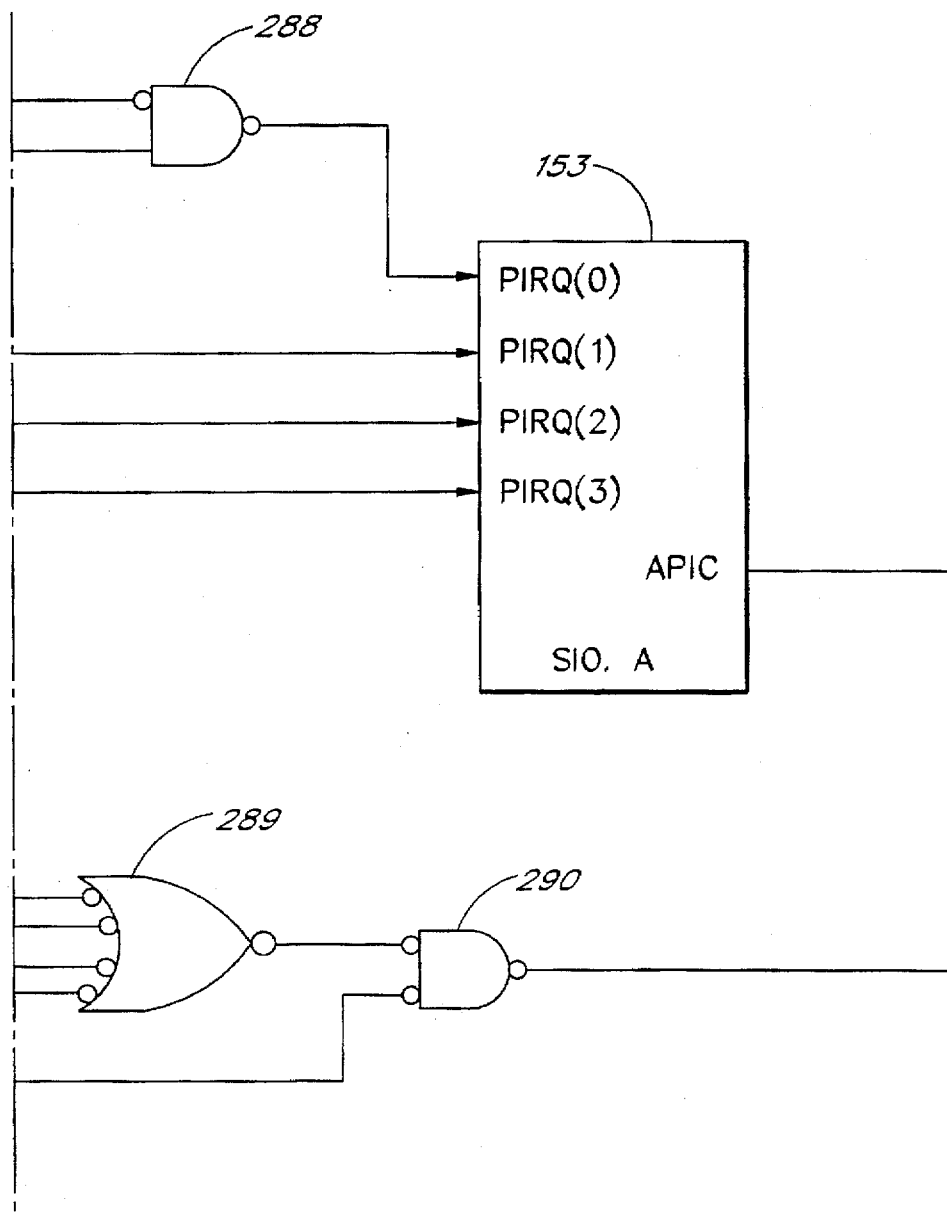
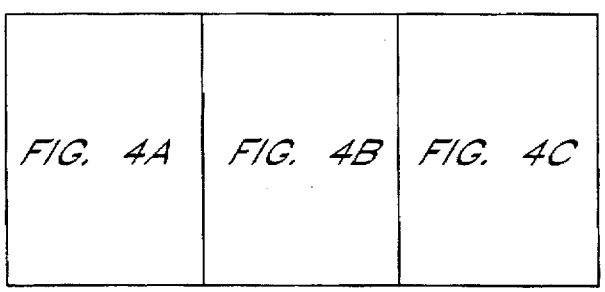
FIG. 4

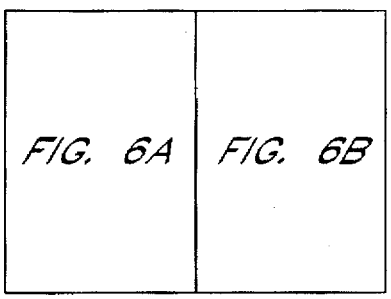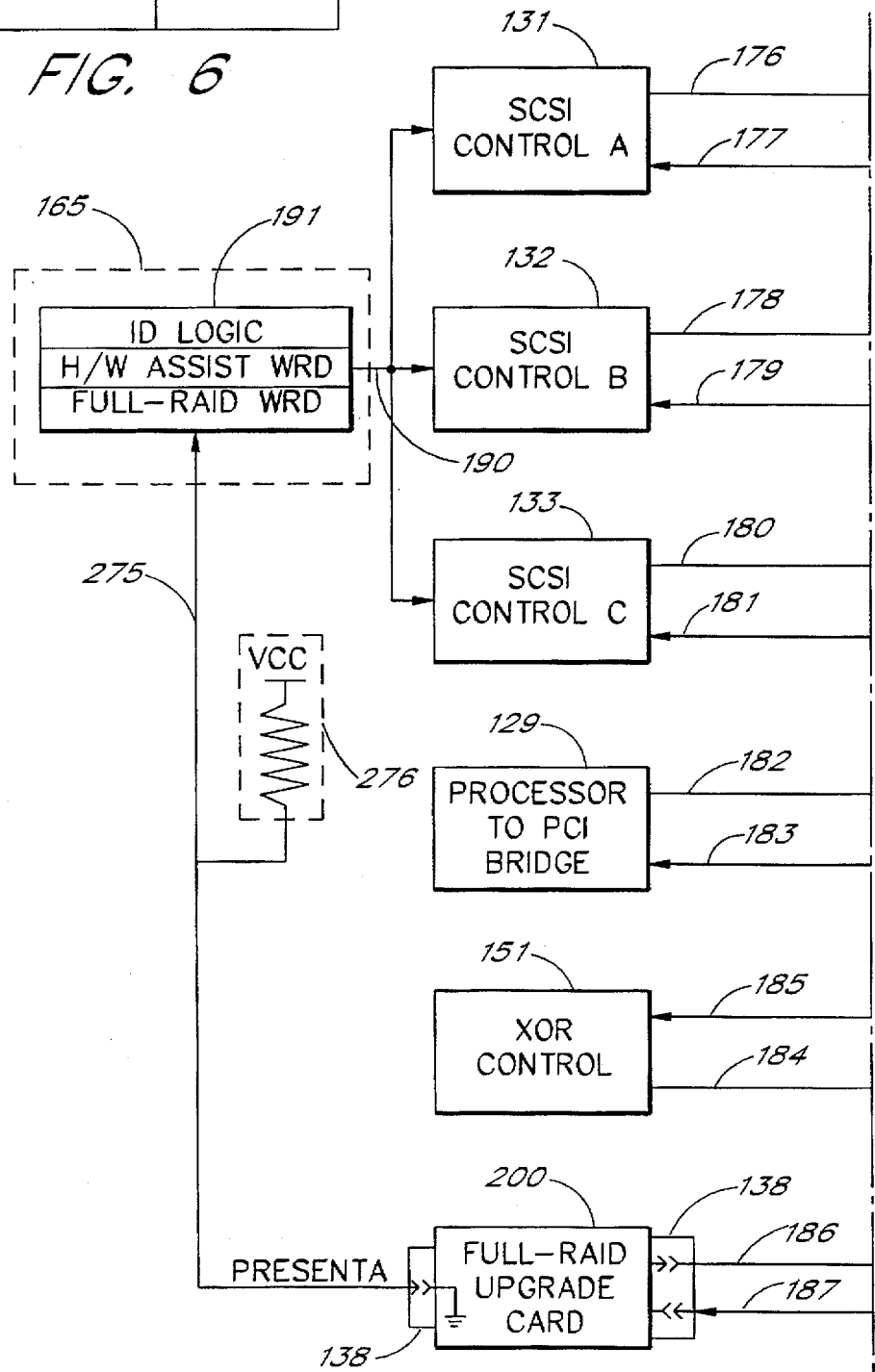

STATE DIAGRAM CONDITION NAME-TO-CONDITION CROSS-REFRENCE

| CONDITION NAME (STATE #/TO STATE #) | CONDITION |
|---|---|
| 0-0 | NO REQUEST |
| 0-1 | !SYBREQCPU |
| 0-2 | !SYBREQA & SYBREQCPU |
| 0-3 | !SYBREQB & SYBREQCPU & SYBREQA |
| 0-4 | !SYBREQC & SYBREQCPU & SYBREQA & SYBREQB |
| 0-5 | !SYBREQD & SYBREQCPU & SYBREQA & SYBREQB & SYBREQC |
| 1-0 | NO REQUEST |
| 1-1 | (!SYBREQCPU & NO OTHER REQUESTS) OR (!SYBREQCPU & !SYLOCKCPU) |
| 1-6 | ANY OTHER REQUEST & SYLOCKCPU |
| 2-0 | NO REQUEST |
| 2-2 | !SYBREQA & NO OTHER REQUEST |
| 2-7 | ANY OTHER REQUEST |
| 3-0 | NO REQUEST |
| 3-3 | !SYBREQB & NO OTHER REQUEST |
| 3-8 | ANY OTHER REQUEST |
| 4-0 | NO REQUEST |
| 4-4 | !SYBREQC & NO OTHER REQUEST |
| 4-9 | ANY OTHER REQUEST |
| 5-0 | NO REQUEST |
| 5-5 | !SYBREQD & NO OTHER REQUEST |
| 5-10 | ANY OTHER REQUEST |
| 6-0 | NO REQUEST |
| 6-2 | SYBREQCPU & !SYBREQA |
| 6-3 | SYBREQCPU & SYBREQA & !SYBREQB |
| 6-4 | SYBREQCPU & SYBREQA & SYBREQB & !SYBREQC |
| 6-5 | SYBREQCPU & SYBREQA & SYBREQB & SYBREQC & !SYBREQD |
| 6-6 | !SYBREQCPU |
| 7-0 | NO REQUEST |
| 7-1 | !SYBREQCPU & SYBREQA & SYBREQB & SYBREQC & SYBREQD |
| 7-3 | !SYBREQB & SYBREQA |

FIG. 8B

| CONDITION NAME (STATE #/TO STATE #) | CONDITION |
|---|---|
| 7-4 | !SYBREQC & SYBREQA & SYBREQB |
| 7-5 | !SYBREQD & SYBREQA & SYBREQB & SYBREQC |
| 8-0 | NO REQUEST |
| 8-1 | !SYBREQCPU & SYBREQC & SYBREQC & SYBREQD |
| 8-2 | !SYBREQA & SYBREQB & SYBREQC & SYBREQD & SYBREQCPU |
| 8-4 | !SYBREQC & SYBREQB |
| 8-5 | !SYBREQD & SYBREQB & SYBREQC |
| 8-8 | !SYBREQB |
| 9-0 | NO REQUEST |
| 9-1 | !SYBREQCPU & SYBREQC & SYBREQD |
| 9-2 | !SYBREQA & SYBREQC & SYBREQD & SYBREQCPU |
| 9-3 | !SYBREQB & SYBREQA & SYBREQC & SYBREQD & SYBREQCPU |
| 9-5 | !SYBREQD & SYBREQC |
| 9-9 | !SYBREQC |
| 10-0 | NO REQUEST |
| 10-1 | !SYBREQCPU & SYBREQD |
| 10-2 | !SYBREQA & SYBREQD & SYBREQCPU |
| 10-3 | !SYBREQB & SYBREQA & SYBREQD & SYBREQCPU |
| 10-4 | !SYBREQC & SYBREQA & SYBREQB & SYBREQD & SYBREQCPU |
| 10-10 | !SYBREQD |

NOTE 1: SCB BUS REQUESTS AND SYLOCKCPU ARE ACTIVE LOW
NOTE 2: "!" = NOT

FIG. 8C

IMPROVED BUS INTERFACE TO A RAID ARCHITECTURE

BACKGROUND OF THE INVENTION

1. Field of the Invention

The invention relates to Redundant Arrays of Inexpensive Disks (RAID) and, in particular, to an improved interface to a RAID architecture for a file server.

2. Description of the Related Art

Within the computer industry and more specifically within the computer data storage field, multiple data storage units are often coupled as an array to provide increased data storage capability for computer file servers. In addition to increasing the data storage size, these devices also increase the speed at which data can be stored and accessed by spreading a block of data among several storage units. For example, several disk drives within an array subsystem may be used to store a block of data, even though the block of data would fit within one disk drive. By storing the data on multiple disk drives, there is less time spent waiting for mechanical movement of read/write heads to a different disk track, or waiting for rotation of the storage media itself. Instead, data is read in "parallel" fashion from multiple disks to allow faster data access. In this manner, data can be read faster, thus reducing or eliminating the time spent in computer wait states. An additional benefit of disk arrays is fault tolerance. By utilizing one disk of the array to store parity information, the disk array system may continue to read and write data accurately, even in the event of a failure of one disk drive within the array. Typically, this is accomplished by performing an exclusive-OR function on the data transferred to or from multiple drives.

The disk storage devices that use low cost disk drives as part of an array are referred to as RAID subsystems. RAID subsystems are commonly used within file server as mass storage devices. See, for example, "A Case for Redundant Arrays of Inexpensive Disks (RAID)", by David Patterson et al., University of California Berkeley, Report No. UCB/CSD 87/391, December 1987.

In most file server systems, the RAID subsystem consists of multiple disk controllers, where each controller controls one or more disk drives. In a typical file server system, such as one based on a Pentium Pro platform, the disk controllers are resident on a standard computer bus such as a Peripheral Component Interconnect (PCI) bus, where the bus bandwidth is shared with other peripherals. One drawback to having the controllers resident on the shared PCI bus is that the RAID subsystem competes with the other peripherals for the bus's limited total bandwidth of 133 Mbytes/sec (for a 32 bit PCI bus), and thus the RAID subsystem only receives a fraction of the PCI's bandwidth. Thus, the shared PCI bus forms a bottleneck to the transfer of data to and from the RAID subsystem. The performance of the file server system would therefore be significantly enhanced if the RAID subsystem did not have to share PCI bus bandwidth with other components.

The array control implementation for the RAID subsystem has typically fallen into one of three categories: software-RAID, hardware-assisted RAID, or full-RAID. In software-RAID, the operating system, such as Windows NT or Novell Netware, running on the host CPU, handles all the array control functions. This is a low cost RAID implementation, with no added expense for array control hardware. However this implementation has the disadvantage of burdening the CPU with such tasks as allocating disk read/write requests to each drive, servicing RAID subsystem interrupts, and in the case of redundant RAID, performing the exclusive-OR (XOR) function on data being transferred to or from the RAID subsystem. Furthermore, if the RAID subsystem implements a version of parity, then parity information, as well as data, must be transferred across the I/O bus to the CPU, using additional bus bandwidth, which may also adversely impact CPU performance. Hardware-assisted RAID uses dedicated hardware to implement the XOR function. This implementation has the advantage of reducing loading on the host CPU and the I/O bus, with only a moderate additional cost associated with the hardware required to implement the XOR function, but has the disadvantage in that the host CPU still must allocate disk requests to the individual drives and service interrupts from the RAID subsystem. Full-RAID incorporates an intelligent controller within the RAID subsystem to control the array, as well as incorporating the XOR circuity. This implementation has the advantage of reducing the load put on the host CPU and the I/O bus relative to the software-RAID and hardware-assisted RAID implementations. However, including the full-RAID intelligent controller adds significant cost to the RAID subsystem. Because there is a cost-benefit tradeoff in achieving a higher performance RAID subsystem which may change as user requirements change, the architecture of a hardware-assisted RAID subsystem would be significantly enhanced if the subsystem could be easily upgraded to full-RAID.

SUMMARY OF THE INVENTION

The present invention is an architecture and method for improving the interface to a RAID architecture for a file server. The file server includes a processor coupled to a processor bus. The processor bus is coupled to a peripheral bus by a first bridging circuit. The file server also contains a RAID subsystem having an array of disks. The array of disks is controlled by a disk controller. The disk controller is coupled to a local RAID bus. The local RAID bus is coupled to the processor bus by a second independent bridging circuit.

One aspect of the present invention is a file server system which provides increased bandwidth between a processor, a memory and a redundant array of inexpensive disks (RAID). The file server system comprises a processor coupled to a processor bus. The system further comprises a peripheral bus and first bridging circuit which couples the processor bus to the peripheral bus. The file server system also includes an array of disks. The array of disks is controlled by a disk controller coupled to a local RAID bus. The local RAID bus is coupled to the processor bus by a second bridging circuit which is independent of the first bridging circuit. In a preferred embodiment, the peripheral bus and local RAID bus are PCI buses. In another preferred embodiment, the disk controller is a SCSI disk controller. In yet another preferred embodiment, the processor is a microprocessor.

In a particularly advantageous embodiment, the RAID subsystem is a hardware-assisted RAID implementation which is upgradeable to full-RAID. The file server includes a full-RAID upgrade connector coupled to the local RAID bus. An upgrade controller board is inserted into the upgrade connector to provide a full-RAID subsystem.

Another aspect of the present invention is a file server system which is upgradeable from a hardware-assisted implementation of a RAID subsystem to a full-RAID implementation of RAID. The system comprises a processor connected to a processor bus. The system further comprises an array of disks and a disk controller which controls the array of disks. The file system includes a first peripheral bus coupled to the disk controller and a first bridging circuit which couples the first peripheral bus to the processor bus. The system further comprises a full-RAID upgrade connector connected to the first peripheral bus. An upgrade controller board is inserted into the upgrade connector. The upgrade controller card cooperates with the RAID subsystem to provide a full-RAID subsystem. In a preferred embodiment, the first peripheral bus is a PCI bus. In yet another preferred embodiment, the disk controller is a SCSI disk controller. In still another preferred embodiment, the file system further comprises a second peripheral bus and a second bridging circuit which couples the second peripheral bus to the processor bus. The second peripheral bus and the second bridging circuit operate independently of the first peripheral bus and the first bridging circuit.

Another aspect of the present invention is a method of increasing the bandwidth between a processor, a memory and a RAID subsystem. The method comprises the steps of coupling a processor to a processor bus and coupling the processor bus to a peripheral bus via a first bridging circuit. The method further comprises the steps of coupling an array of disks to a disk controller and coupling a local RAID bus to the disk controller. The method includes the further step of coupling the local RAID bus to the processor bus via a second bridging circuit independent of the first bridging circuit.

BRIEF DESCRIPTION OF THE DRAWINGS

FIGS. 8B and 8C are tables which identify the conditions which cause the state diagram transitions in FIG. 8A.

DETAILED DESCRIPTION OF THE PREFERRED EMBODIMENT

Figure 1:
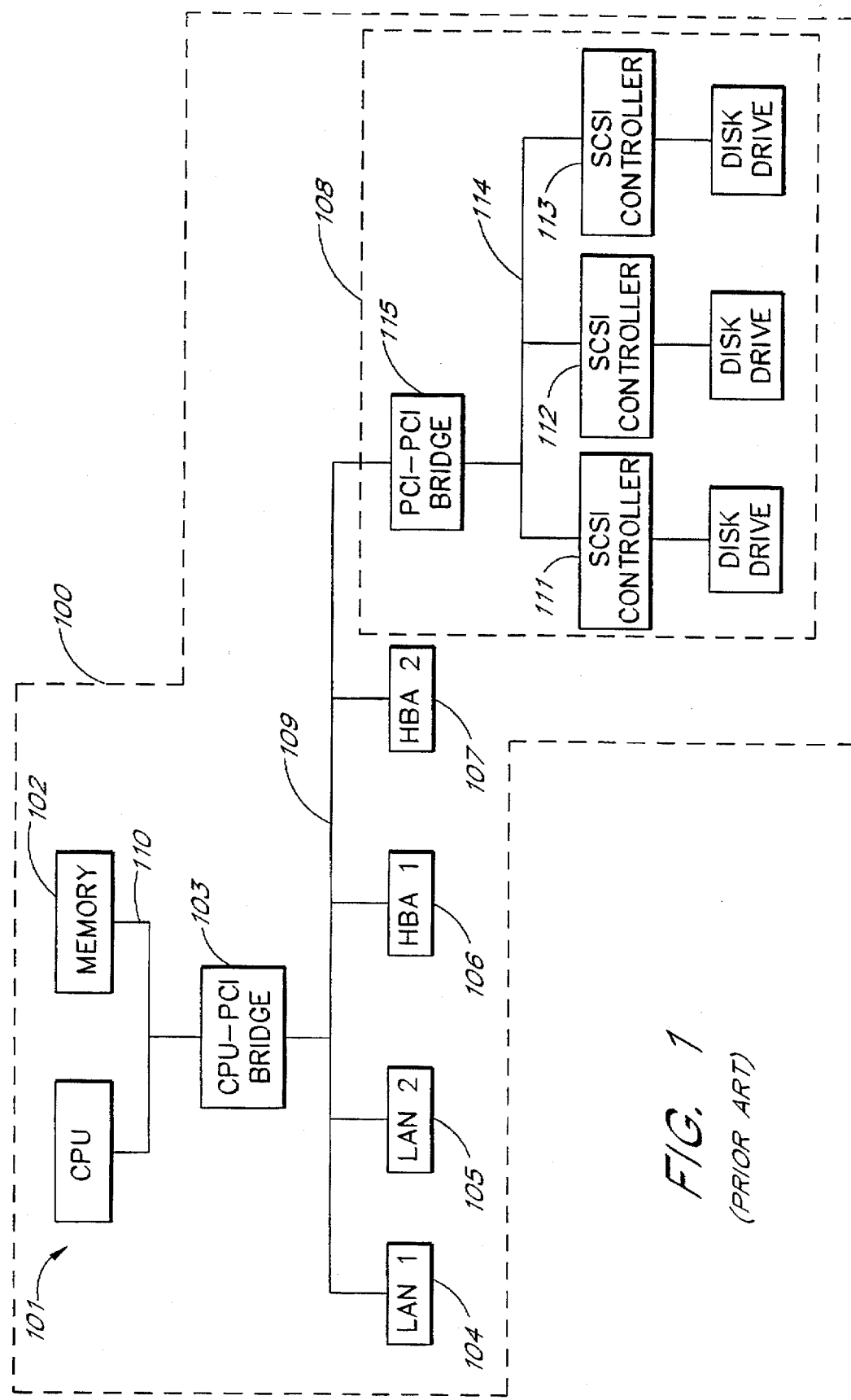
FIG. 1 is a block diagram illustrating a RAID architecture used by existing file servers.

A brief description of the architecture used by existing file servers to interface to RAID subsystems will initially be provided with reference to FIG. 1.

FIG. 1 illustrates the prior art bus architecture used to interface a RAID subsystem 108 to a processor bus 110 of a file server system 100. The file server system 100 includes a microprocessor 101, such as a Pentium Pro, which directs the activities of the file server system 100. The microprocessor 101 is coupled to the processor bus 110, through which it communicates with other components of the file server system 100. The file server system 100 further comprises a primary PCI bus 109 for interfacing peripherals to the rest of the file server system 100. A processor-to-PCI bridge 103 couples the processor bus 110 to the primary PCI bus 109. The RAID subsystem 108 provides the file servers's 100 mass storage, and comprises one or more SCSI disk controllers 111, 112, 113 which are coupled to one another by a dedicated, local PCI bus 114. Each SCSI disk controller may control one or more disks. A PCI-to-PCI bridge 115 couples the primary PCI bus 109 to the RAID subsystem's local PCI bus 114.

The Pentium Pro's processor bus 110 has a bandwidth of 533 Mbytes/sec. This bandwidth is shared by the primary PCI bus 109, which has a bandwidth of only 133 Mbytes/sec, as well as any other components, such as a memory 102, which are directly coupled to the processor bus 110. The 133 Mbytes/sec bandwidth of the primary PCI bus 109 is then shared by the RAID subsystem 108, a first LAN 104, a second LAN 105, a first Host Bus Adapter (HBA) 106, a second HBA 107, as well as any other peripherals which may reside on the primary PCI bus 109. Thus the RAID subsystem 108 competes with other peripherals for a fraction of the limited bandwidth of the primary PCI bus 109. The greater the bandwidth required for the other peripherals residing on the primary PCI bus 109, the less bandwidth that will be available for the RAID subsystem 108. Thus, the prior art architecture imposes a bottleneck on the transfer of data to and from the RAID subsystem 108 from and to components residing on the processor bus 110. A further limitation on the transfer rate of data to and from the RAID subsystem 108, is caused by the two levels of bridges required to couple the RAID subsystem to the processor bus—first the processor-to-PCI bridge 103, and then the PCI-to-PCI bridge 115. Each bridge requires a certain mount of overhead for each block transfer of data, which further reduces the rate of data transfers to or from the RAID subsystem 108.

Figure 2:
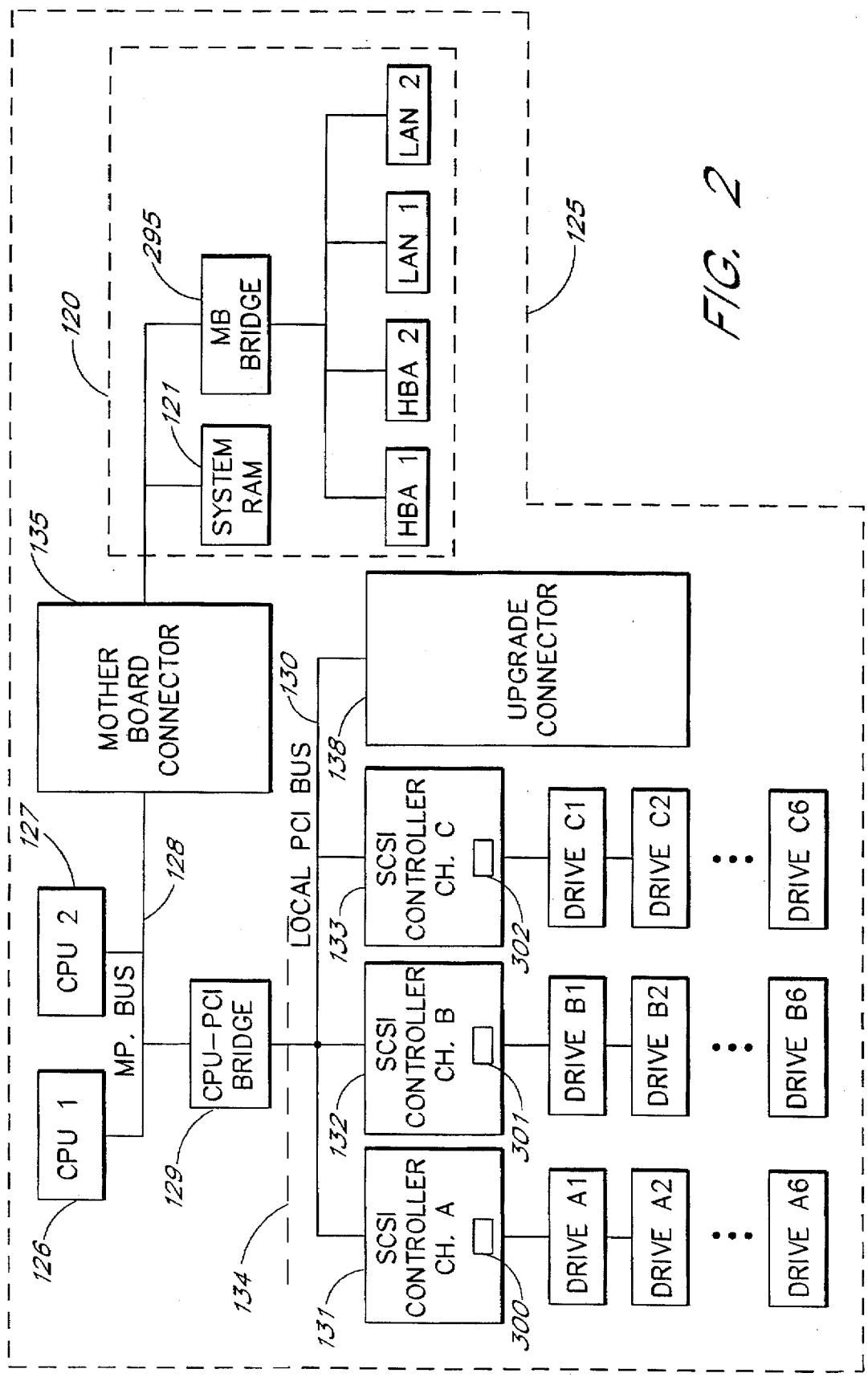
FIG. 2 is a block diagram illustrating the architecture of the present invention for providing a dedicated bridge circuit between the processor bus and the RAID disk controllers.

FIG. 2 illustrates the architecture of the present invention. This RAID architecture provides for a dedicated processor-to-PCI bridging circuit 129 from a microprocessor bus (MP bus) 128 to a RAID subsystem's local PCI bus 130. The dedicated bridging circuit 129 allows the subsystem 134 to use the full 133 Mbytes/sec of the PCI bus bandwidth by eliminating sharing of the PCI bus 130 with other peripherals. In addition, the present invention eliminates one level of bridging, a PCI-to-PCI bridge, between the RAID subsystem 134 and the MP bus 128. A single printed circuit card contains a first microprocessor (CPU1) 126, and a second microprocessor (CPU2) 127, bridging circuitry 129, first, second and third SCSI controllers 131,132, 133, and a full-RAID upgrade connector 138. The printed circuit card is connected to the rest of the file server system 125 by a motherboard connector 135, which is inserted into a motherboard 120. The present invention permits upgrading of the RAID subsystem 134, from a hardware-assisted RAID to a full-RAID architecture, by inserting a full-RAID upgrade card 200 (FIG. 7) into the upgrade connector 138.

Figure 3:
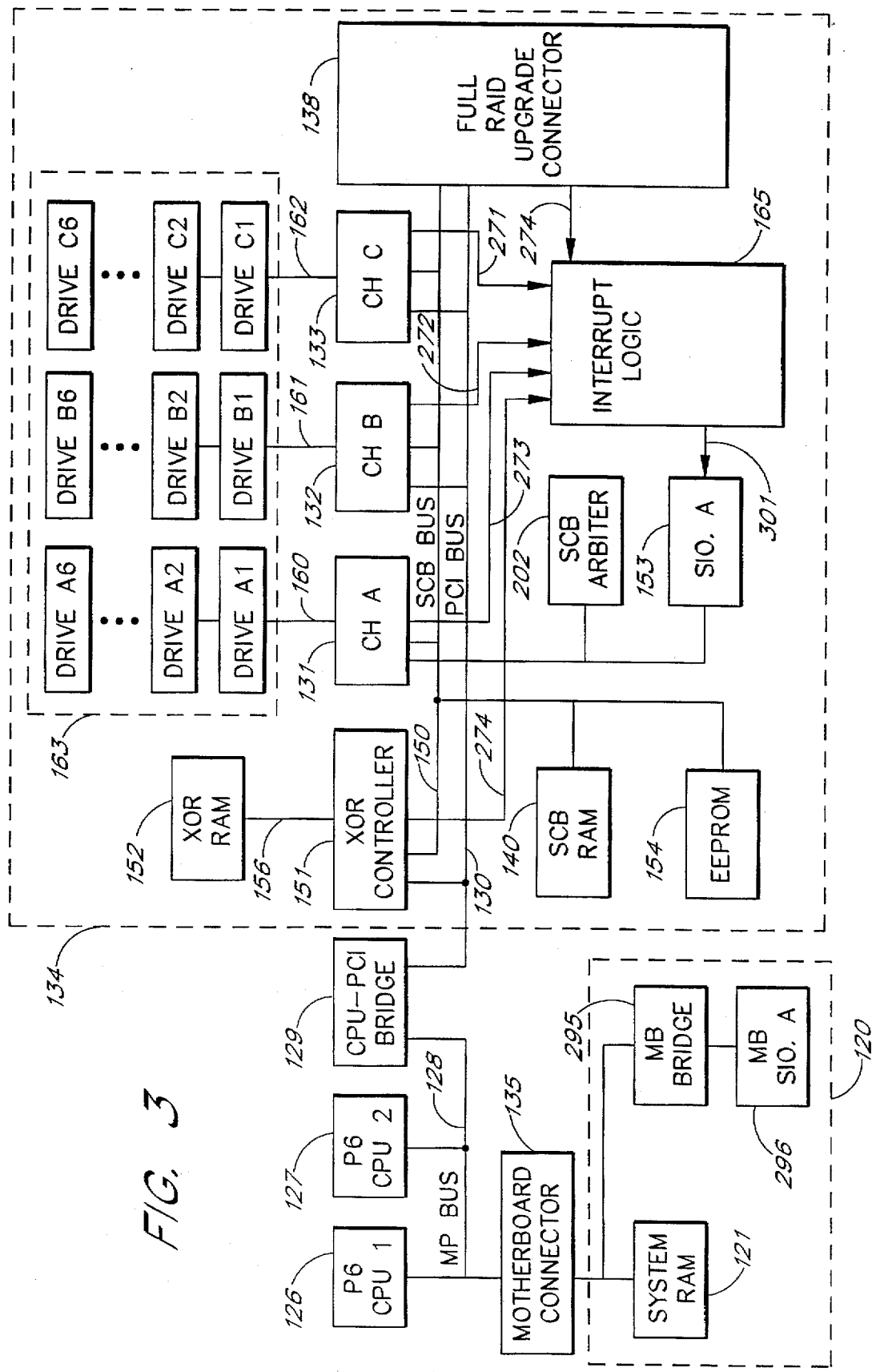
FIG. 3 is a more detailed block diagram illustrating the architecture of the processor/RAID controller card.

As shown in FIG. 3, the CPU1 126 and the CPU2 127 share the common MP bus 128. The MP bus 128 is connected to the processor-to-PCI bridge 129, and to the motherboard connector 135. When the motherboard connector 135 is inserted into the motherboard 120, the MP bus 128 is connected to the system Read/Write Random Access Memory (RAM) 121, and to a processor-to-MotherboardPCI bridge (MB) 295. The dedicated RAID processor-to-PCI bridge 129 couples the MP bus 128 to the dedicated local PCI bus 130, which is connected to an XOR (exclusive-OR) controller 151, to the first, second and third SCSI controllers (SCSI Controller A 131, SCSI Controller B 132, SCSI Controller C 133), to a System I/O & Arbitration chip (SIO.A) 153 such as from the Intel S82379 series of chips, which provides PCI interrupt handling and PCI bus arbitration, and to the full-RAID upgrade connector 138. An SCB (SCSI Command Block) bus 150, interconnects the XOR controller 151, the SCB RAM 140, a BIOS EEPROM 154, the SCSI Controller A 131, the SCSI Controller B 132, the SCSI Controller C 133, and the full-RAID upgrade connector 138. The XOR controller 151 is connected to an XOR memory 152, by a bus 156.

The SCSI controllers 131, 132, 133, each have a SCSI bus 160, 161, 162, respectively, connected to one or more disk drives in daisy chain fashion (FIG. 3).

Figure 4A:
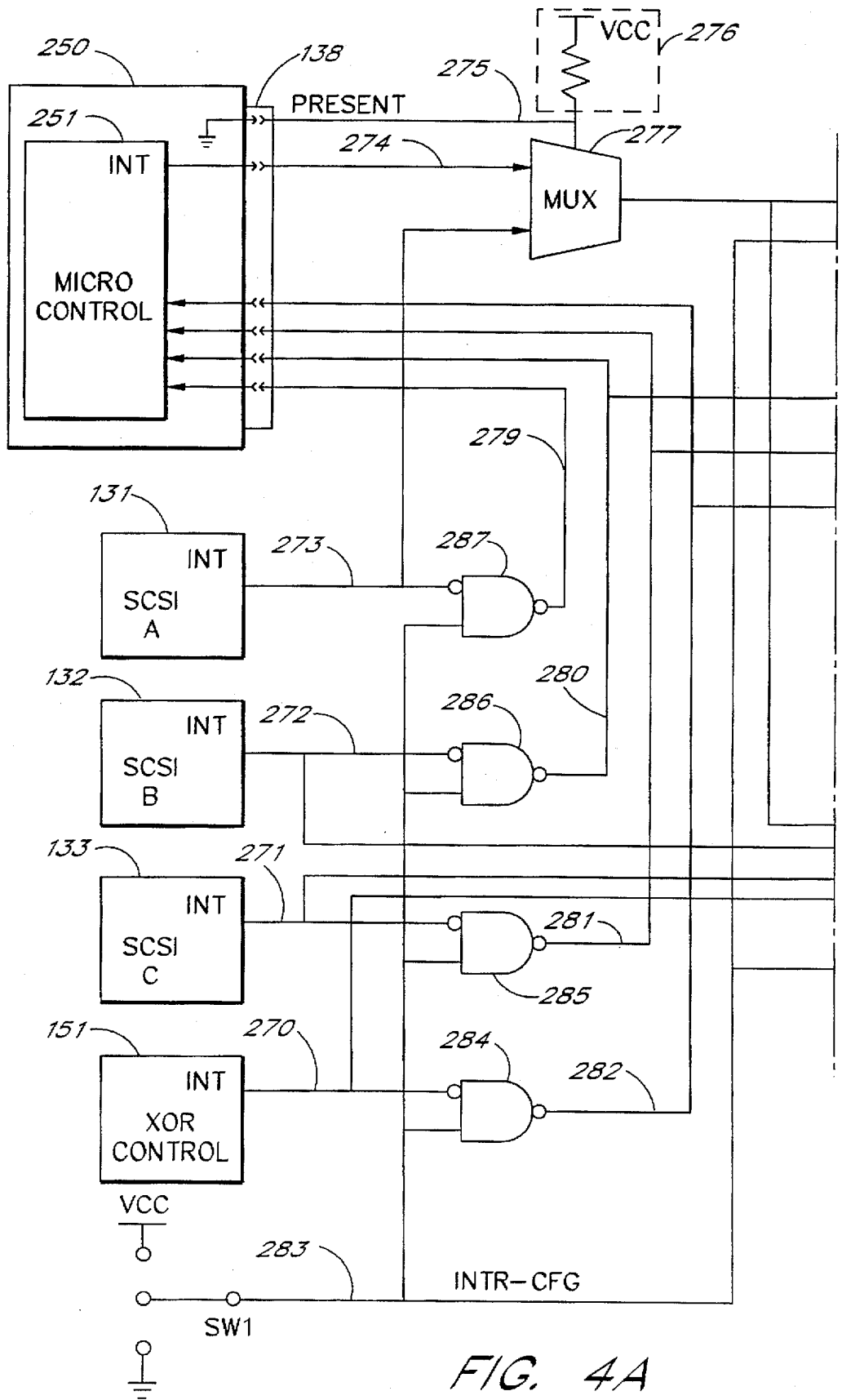
FIG. 4 illustrates the PCI interrupt circuitry of the present invention.
Figure 4C:
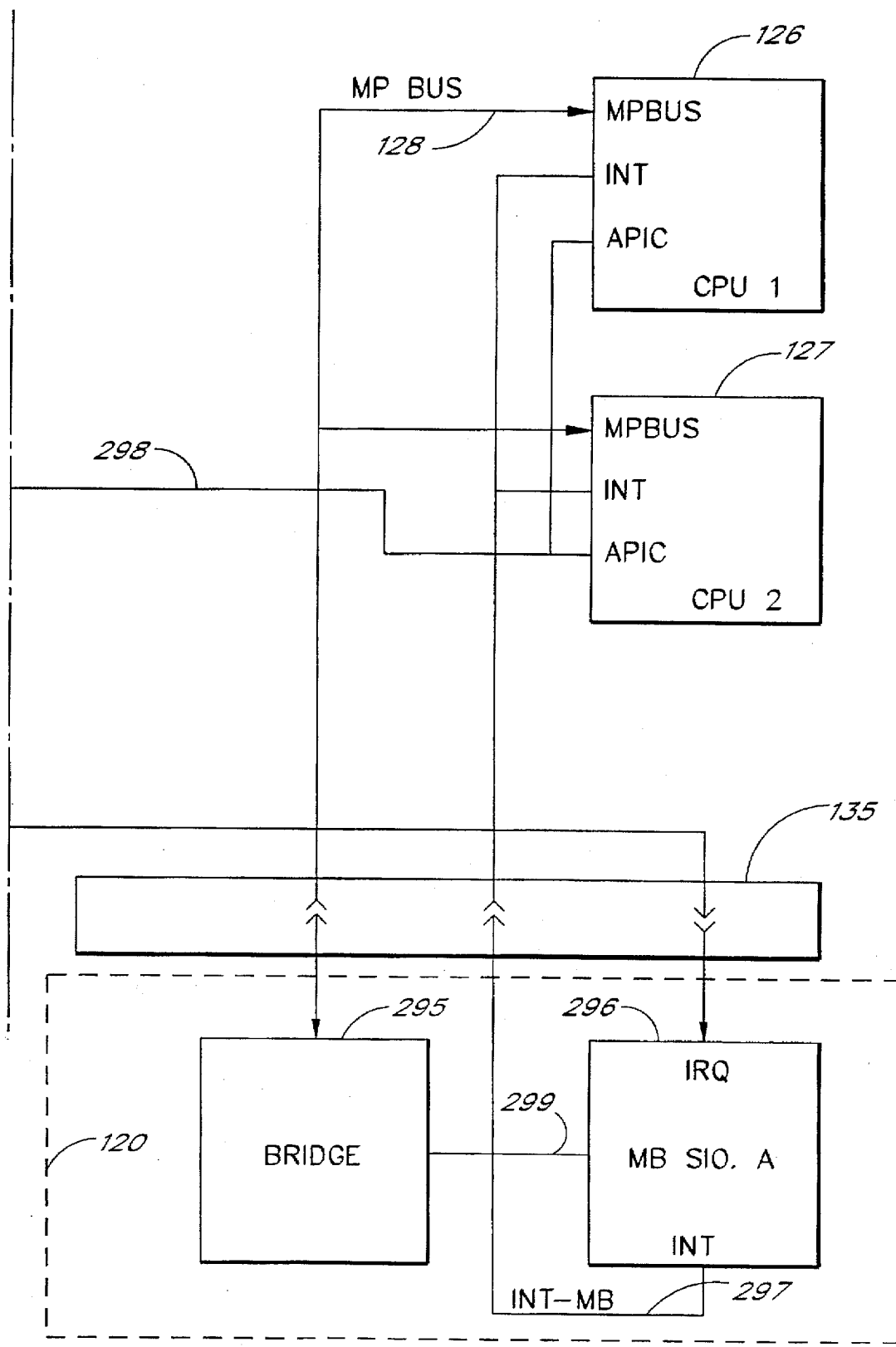

As shown in FIG. 4, interrupt request outputs (INT) from each of the SCSI controllers 131, 132, 133, and from the XOR controller 151, are connected respectively to inverting inputs of NAND gates 287, 286, 285 and 284. The interrupt request output, INT, from the SCSI Controller A 131 is also connected to a first input of a mux 277. A second input of the mux 277 is connected to the full-RAID upgrade connector 138. A mux select signal (PRESENT*) 275 connects a select input (S) of the mux 277 to the full-RAID upgrade connector 138, and to a pull-up resistor 276. When a full-RAID upgrade card 250, including a microcontroller 251, is inserted into the full-RAID upgrade connector 138, an interrupt output (INT) from the microcontroller 251 is connected through the full-RAID upgrade connector 138 to the second input of the mux 277, and a ground line is connected to the select line (PRESENT*) 275. The mux 277 has an output connected to an inverting input of the NAND gate 288. A NAND gate 290 has a first inverting input, and a plurality of NAND gates 288, 287, 286, 285, 284 have respective non-inverting inputs, connected by a line INTR_CFG 283 to a switch SW1. The NAND gates 287, 286, 285, 284 have respective outputs which are connected to the full-RAID upgrade connector 138, and, if the full-RAID upgrade card is inserted into the connector 138, to the microcontroller 251. The outputs of the NAND gates 288, 287, 286, 285, 284 are also connected respectively, to PIRQ(0), PIRQ(1), PIRQ(2), PIRQ(3) PCI interrupt request inputs of the SIO.A chip 153 (e.g., Intel S82379). An Advanced Peripheral Interrupt Controller (APIC) interface of the SIO.A 153 is connected to APIC interfaces of the CPU1 126 and the CPU2 127. The output of the mux 277 and the interrupt outputs INT of the SCSI controller B 132, the SCSI Controller C 133 and the XOR controller 151, are connected respectively to first, second, third, and fourth inverting inputs of a NOR gate 289. The NOR gate 289 has an output which is connected to a second inverting input of a NAND gate 290. The NAND gate 290 has an output connected through the motherboard connector 135, to an IRQ input of a Motherboard SIO.A (MB SIO.A) 296. The MB SIO.A 296 has an interrupt output (INT) connected by a line 297, through the motherboard connector 135 to an interrupt (INT) input of the CPU1 126, and to an interrupt (INT) input of the CPU2 127. A motherboard PCI bus 299 connects the MB SIO.A 296 to the processor-to-MotherboardPCI bridge 295. The MP bus 128 connects the processor-to-MotherboardPCI bridge 295 to an MP bus interface on the CPU1 126 and the CPU2 127.

Figure 5:
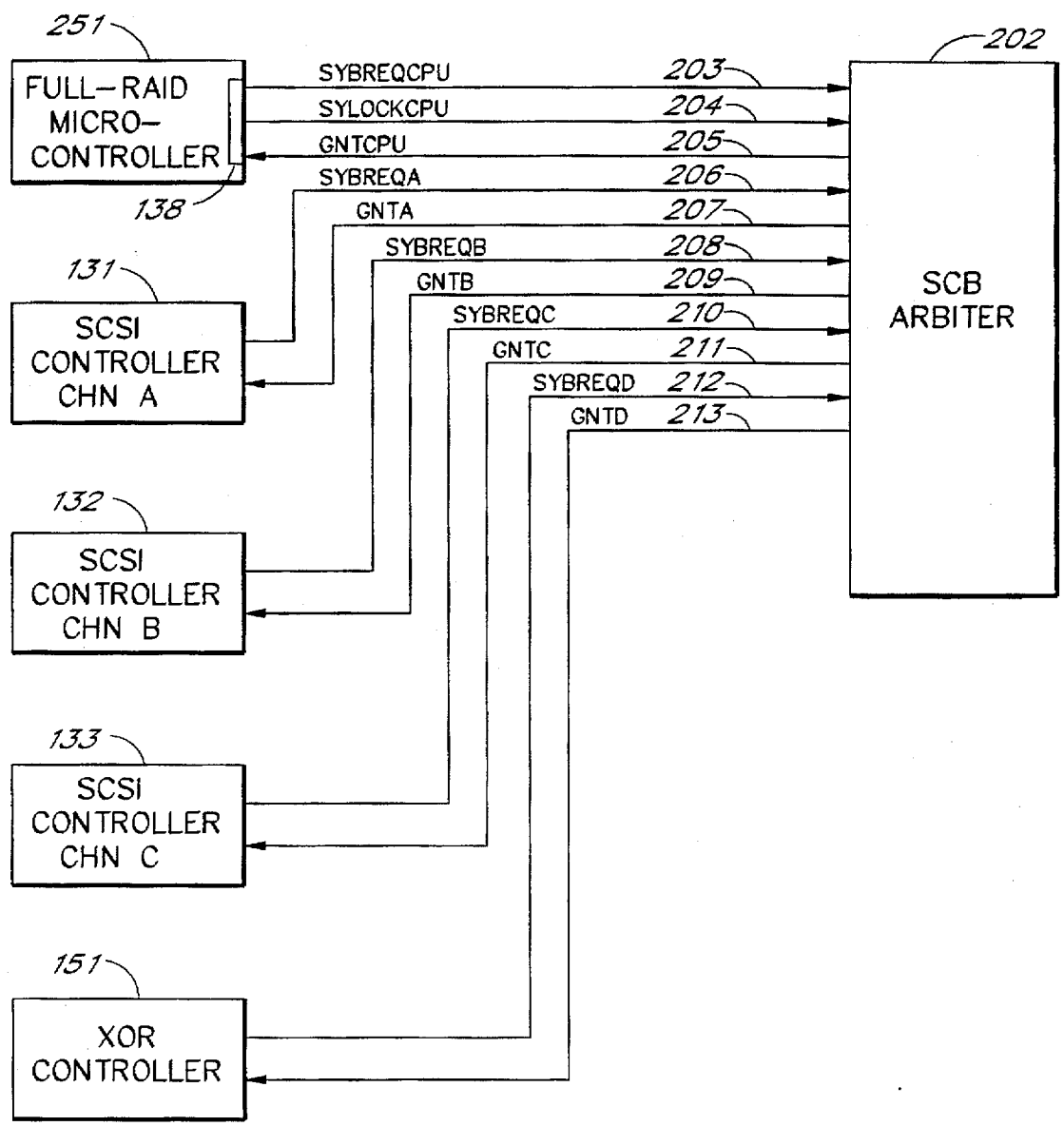
FIG. 5 illustrates an SCSI Command Block (SCB) arbitration circuitry of the present invention.

As shown in FIG. 5, SCB bus request lines from the full-RAID upgrade connector 138 (a line 203), from each of the SCSI controllers 131, 132, 133 (lines 206, 208, 210), and from the XOR controller 151 (a line 212), are connected to an SCB Arbiter 202. Additionally, a SyLockCPU line 204 from the full-RAID upgrade connector 138 is connected to the SCB Arbiter 202. The SCB Arbiter 202 generates SCB bus grants over lines 205, 207, 209, 211, 213, which are respectively connected to the full-Raid upgrade connector 138, to the SCSI controllers 131, 132, 133, and to the XOR controller 151.

Figure 6B:
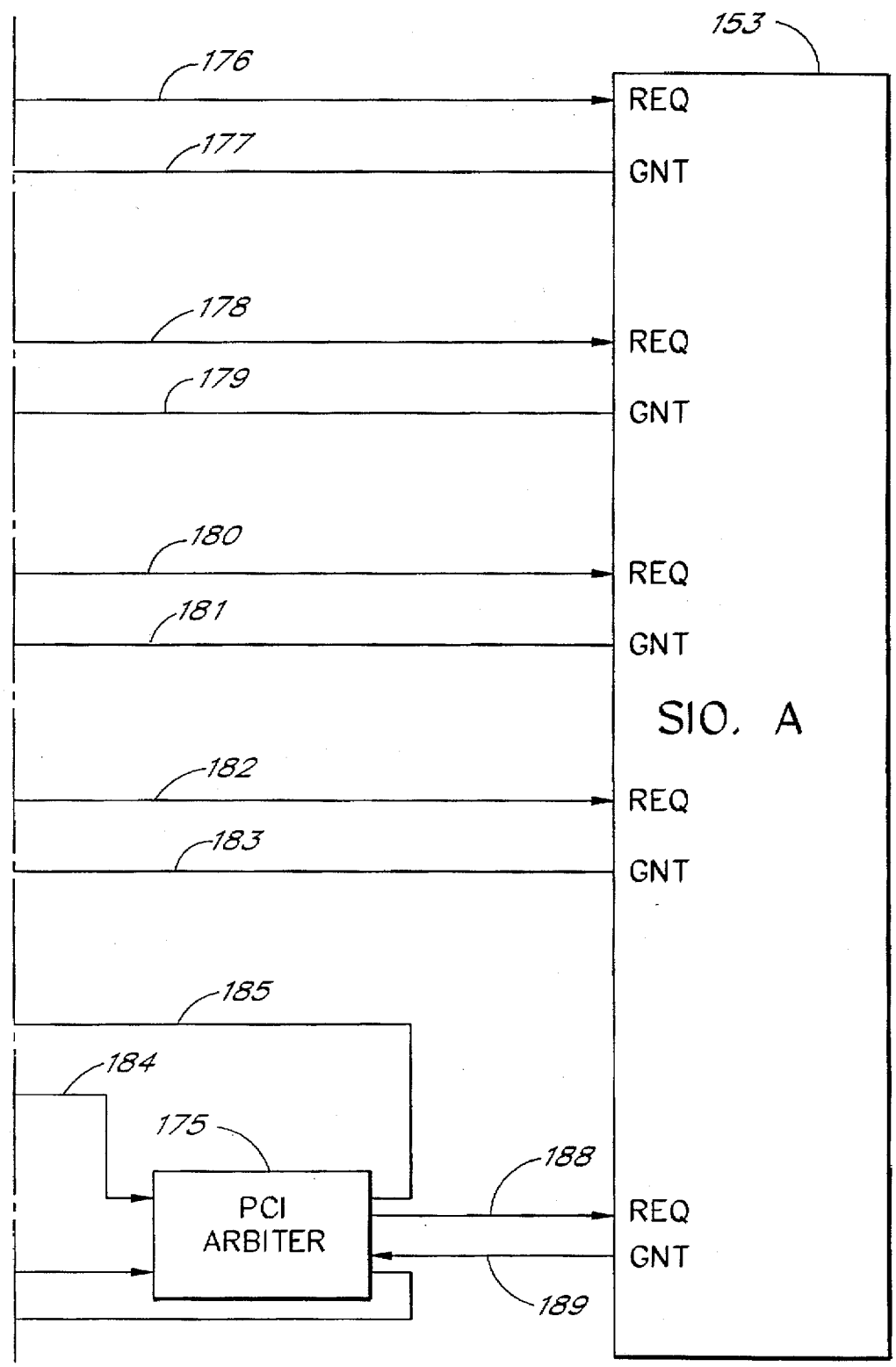
FIG. 6 illustrates the PCI arbitration circuitry of the present invention.

As shown in FIG. 6, the PCI bus requests lines 176, 178, 180, 182, respectively from the SCSI controllers 131, 132, 133, and from the processor-to-PCI bridge 129, are connected to the SIO.A chip 153 (e.g., Intel S82379). Bus grant lines 177, 179, 181, 183 from the SIO.A chip 153 are connected respectively to the SCSI controllers 131, 132, 133, and to the processor-to-PCI bridge 129. The PCI bus request from the XOR controller 151 over the line 184 and PCI bus request from the full-RAID upgrade connector 135 over the line 186 are connected to the PCI Arbiter 175. The PCI Arbiter 175 generates a bus request on the line 188, which is connected to the SIO.A 153. The SIO.A 153 generates a bus grant signal on the line 189 which is connected to the PCI Arbiter 175. The PCI Arbiter 175 generates bus grant signals, on lines 185, 187, which are respectively connected to the XOR controller 151 and to the full-RAID upgrade connector 138.

The line 190 from the ID logic 191 is connected to the SCSI controllers 131, 132, 133. The PRESENT* line 275 is connected from the full-RAID upgrade connector to the ID logic 191 and to the pull-up resistor 276.

Figure 7:
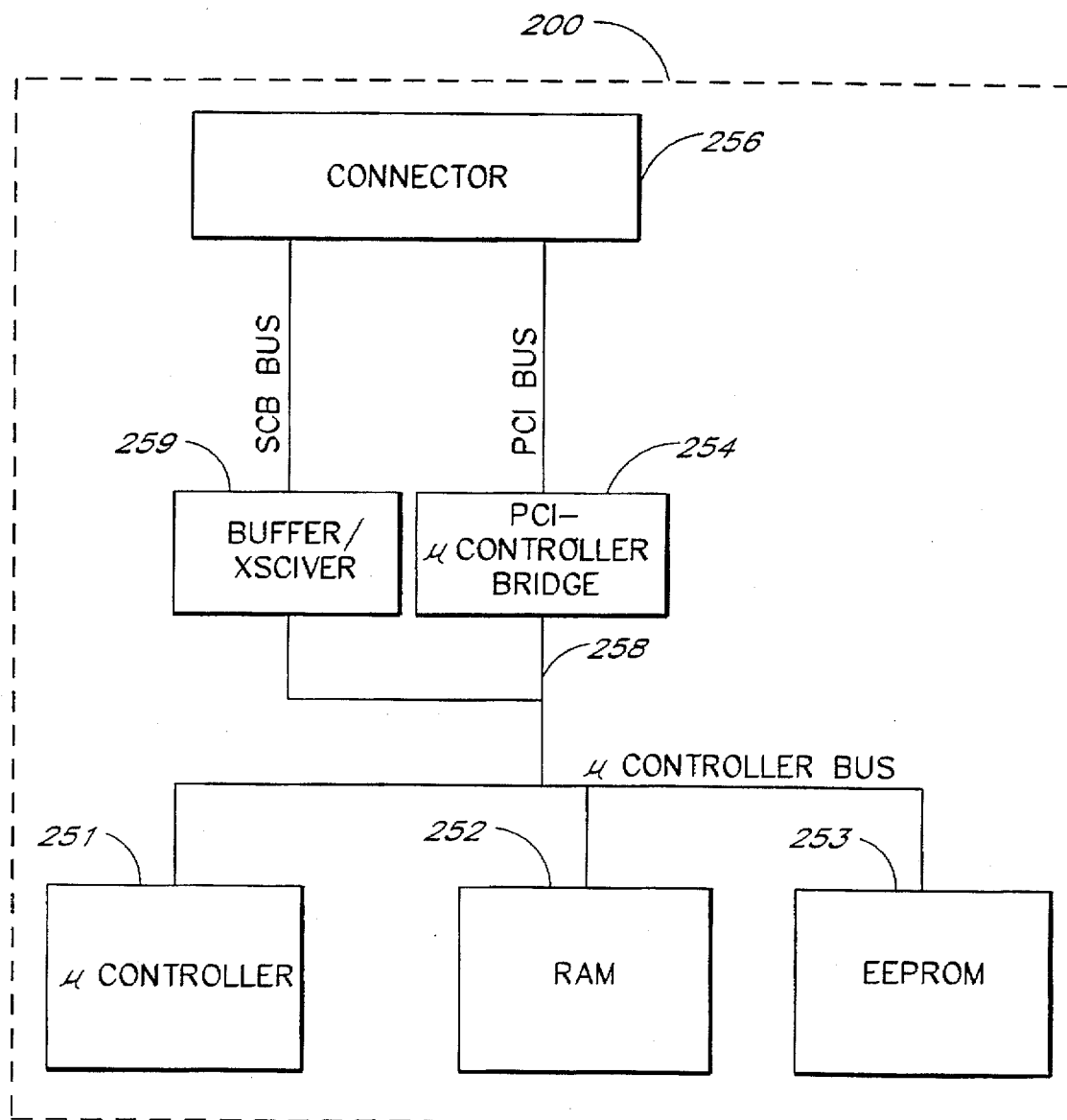
FIG. 7 is a block diagram of the full-RAID upgrade card.

FIG. 7 illustrates the full-RAID upgrade card 200. A microcontroller 251 is connected to a local RAM 252, to a local BIOS EEPROM 253, and to a first I/O terminal of a buffer/transceiver circuit 259 over a microcontroller bus 258. A microcontroller-to-PCI bridge 254 has a first interface connected to the microcontroller bus 258, and has a second interface connected to a connector 256. The buffer/transceiver circuit 259 has a second I/O terminal connected to the connector 256. When the full-RAID upgrade card's connector 256 is inserted into the full-RAID upgrade connector 138, the microcontroller-to-PCI bridge 254 couples the RAID subsystem's local PCI 130 bus to the microcontroller bus 258. Additionally, the SCB bus 150 is coupled to the microcontroller bus 258 by the buffer/transceiver circuit 259.

The operation of the preferred embodiment will now be described. Several different levels of RAID have been defined and implemented, including RAID 0 (block striped), RAID 1 (mirrored block data), RAID 2 (bit interleaving with Hamming code ECC), RAID 3 (byte striped with a parity drive), RAID 4 (block striped with a parity drive), RAID 5 (block and parity interleaving). See, "A Case for Redundant Arrays of Inexpensive Disks (RAID)", by David Patterson et al., identified above. However, for the purposes of illustrating the features of the preferred embodiment, the following description assumes that the RAID subsystem is operating at a RAID level 5, with parity and block interleaving. However the present invention is not limited to RAID level 5, and the present invention may be used with other RAID levels.

Multiple microprocessors are frequently used in file server systems to provide overall hardware control of the system, and to handle the multiple users and performance demands typically found in file server applications. In the present invention, the CPU1 126 and the CPU2 127, cooperating with an operating system, such as Netware, provide the overall hardware control of the file server system 125 (FIG. 2). Numerous commercially available microprocessors may be used to perform this function. The Intel Pentium Pro is one such microprocessor.

The CPU1 126 and the CPU2 127 communicate with each other, with the processor-to-PCI bridge 129, and with the motherboard over the high bandwidth MP bus 128. The MP bus 128 provides both address and data information to and from the attached devices.

The processor-to-PCI bridge 129 provides a dedicated bridge directly between the MP bus 128 and the RAID subsystem's local PCI bus 130. The direct, dedicated bridge 129 of the present invention has the advantage of eliminating one bridge layer between the MP bus 128 and the RAID local PCI bus 130 when compared to previous RAID architectures. Additionally, the present invention's dedicated bridge 129 eliminates having the RAID subsystem 134 share PCI bandwidth with other peripherals. Thus, the RAID subsystem 134 can utilize all of the PCI bus's 133 Mbyte/sec bandwidth. The primary function of the processor-to-PCI bridge 129 is to map the address space of one bus into the address space of another, and to provide data buffering. The operation of processor-to-PCI bridges is well known in the art, and will not be discussed in detail here. (See, for example, "PCI System Design Guide", revision 1.0, Sep. 8, 1993).

The EEPROM 154 contains the BIOS for the CPU1 126 and the CPU2 127 (FIG. 3). The BIOS provides the interface between the operating system kernel and the hardware, and includes boot-up information and low-level commands.

The following discussion describes the transfer of data to and from the array subsystem 134 operating in hardware-assisted RAID mode (without the full-RAID upgrade card 200). The following discussion assumes that the initiating processor is the CPU1 126 and that the target SCSI controller is the SCSI Controller A 131. The following discussion would similarly apply when the initiating processor was the CPU2 127 and when the target SCSI controller was either the SCSI Controller B 132 or the SCSI Controller C 133. All commands and data transfers between the CPU1 126 and the array subsystem 134 take place through the processor-to-PCI bridge 129, which buffers the data and performs address mapping.

When the CPU1 126 initiates a write operation of new data to the array 163, the CPU1 126 first pauses the XOR Controller's 151 internal operations to avoid contention on the XOR Controller's 151 internal bus (not shown) during the following SCB download. XOR operations, in the context of RAID subsystems, are well known and may be provided by a number of devices, such as, for example, the Adaptec 7810. The CPU1 126 downloads an SCB through the processor-to-PCI bridge 129, to the XOR Controller 151. The XOR Controller 151 writes the SCB to the SCB RAM 140, at the end of any existing SCB queue. The CPU 1126 then passes a pointer, pointing to the just-loaded SCB, through the processor-to-PCI bridge 129, to the XOR Controller 151. The CPU1 126 then commands the XOR Controller 151 to resume its internal operations, allowing the XOR Controller 151 to continue sequencing through the queued SCSI Command Blocks in the SCB RAM 140. When the XOR Controller 151 executes the just-written SCB, the XOR Controller 151 initiates a read operation of the block containing the original data which is to be over-written by the new data, as well as the parity associated with that block, by obtaining the PCI bus 130 and requesting the original data and parity blocks from the SCSI Controller A 131. The SCSI Controller A 131 then transfers all the data within the block, as well as the associated parity, over the local PCI bus 130 to the XOR Controller 151, which stores the data and the associated parity into the XOR RAM 152. The XOR Controller 151 proceeds to initiate a DMA read operation, which transfers the new data from the system RAM 121 to the XOR RAM 152. The XOR Controller 151 calculates the Exclusive-OR of the portion of the block of original data which is to be over-written and the parity corresponding to the original data, and removes the contribution to the parity of the original data which is to be over-written. The XOR Controller 151 next calculates the Exclusive-OR of the result of the previous operation with the new data to be written to the array 163, so that the parity is updated to include the new data's contribution. The XOR Controller 151 then sends an interrupt, through the interrupt circuitry (FIG. 4), to the CPU1 126. The details on how interrupts are routed from the array subsystem 134 to the processors 126, 127, will be discussed below.

The CPU1 126 services the interrupt and pauses the internal operations of the SCSI Controller A 131. The CPU1 126 downloads an SCB through the processor-to-PCI bridge 129 to the SCSI Controller A 131, which stores the SCB in the SCB RAM 140. The CPU1 126 then passes a pointer, pointing to the just-loaded SCB, to the SCSI Controller A 131. The CPU1 126 then commands the SCSI Controller A 131 to resume its internal operations. The SCSI Controller A 131 executes the SCB, arbitrates for the local PCI bus 130, and reads the new data and associated parity block through the XOR Controller 151 from the XOR RAM 152. The SCSI Controller A 131 then arbitrates for the SCSI bus A 160, and writes the data and parity blocks to the appropriate disks within the array 163. Once the write operation is complete, an interrupt is generated by the SCSI Controller A 131 on the line 273 and is sent through the interrupt circuitry (FIG. 4) to the CPU 1126, which services the interrupt.

When the CPU1 126 commands a read operation, the CPU1 126 downloads an SCB to the SCSI Controller A 131, which stores the SCB into the SCB RAM 140. The CPU1 126 then passes a pointer, pointing to the just-loaded SCB, to the SCSI Controller A 131. The SCSI Controller A 131 executes the SCB, reading the requested data into the internal buffer 300 of the SCSI Controller A 131. Once the internal buffer 300 is full, the SCSI Controller A 131 obtains the local PCI bus 130 and performs a DMA write operation through the processor-to-PCI bridge 129 to the system RAM 121. When the write operation is complete, an interrupt is generated by the SCSI Controller A 131 on the line 273 and is sent through the interrupt circuitry (FIG. 4) to the CPU1 126, which services the interrupt.

If the read operation from a disk fails for any reason, such as a physical disk drive failure, data and parity blocks from all disks in the array 163, with the exception of the failed disk, are read into the SCSI Controller A's 131 internal buffer memory 300 until the internal buffer 300 is full. The SCSI Controller A 131 obtains the local PCI bus 130, and writes the data and parity blocks to the XOR Controller 151, which in turn writes the blocks into the XOR RAM 152. The XOR Controller 151 then computes the Exclusive OR of the data and parity, which results in the recovery of the data that was stored on the failing disk. This operation continues until all the data contained within the array subsystem 134 is rebuilt. The XOR Controller 151 then initiates a DMA write operation, transferring the requested data through the processor-to-PCI bridge 129 to the system RAM 121.

FIG. 4 illustrates the interrupt scheme of the present invention in detail. Interrupt handling is well known and provided by any number of parts, such as an Intel S82379AB. However, the Intel S82379AB SIO.A chip 153 used in the preferred embodiment can only handle four PCI interrupts, and the architecture of the present invention requires up to five PCI interrupts (from the SCSI Controller A 131, the SCSI Controller B 132, the SCSI Controller C 133, the full-RAID microcontroller 251, and the XOR controller 151). The preferred embodiment of the present invention includes circuitry which multiplexes the SCSI Controller A 131 interrupt generated on the line 273 and the full-RAID microcontroller 251 interrupt generated on the line 274. This is accomplished by using the mux 277 to route the SCSI Controller A's interrupt on the line 273 to the SIO.A chip 153 when the full-RAID upgrade card 200 is not inserted into the full-RAID upgrade connector 138, and to route the full-RAID microcontroller's interrupt on the line 274 to the SIO.A chip 153 when the full-RAID upgrade card 200 is inserted into the full-RAID upgrade connector 138. Thus, the interrupt line 273 of the SCSI Controller A 131 is connected to the first input of the mux 277, and the full-RAID microcontroller interrupt on line 274 from the full-RAID upgrade connector 138 is connected to the second input of the mux 277. The mux selection is controlled by the PRESENT* line 275, which is connected to the full-RAID upgrade connector 138 and to the pull-up resistor 276. When the full-RAID upgrade card 200 is not inserted into the full-RAID upgrade connector 138, the PRESENT* line 275 will be pulled high by the pull-up resistor 276, thereby selecting the SCSI Controller A interrupt line 273. When the full-RAID upgrade card 200 is inserted into the full-RAID upgrade connector 138, the PRESENT* line 275 will be pulled low, thereby selecting the microcontroller's interrupt line 274. The output of the mux 277 is connected through the NAND gate 288 to a PCI interrupt request input of the SIO.A chip 153.

One difficulty which must be overcome in a multiprocessor Pentium Pro-based file server system 100, utilizing both a dedicated RAID subsystem processor-to-PCI bridge 129, as well as a primary processor-to-MotherboardPCI bridge 295, is that when the file server system is initially booting up, the file server system 100 cannot act in a multiprocessing mode and the BIOS's interrupt handler cannot recognize multiple interrupt controllers. Thus, the BIOS's interrupt handler only recognizes the Motherboard SIO.A 296 (e.g., Intel S82379) which is associated with the primary processor-to-MotherboardPCI bridge 295.

Thus, in the preferred embodiment, if an interrupt is generated by any of the devices in the RAID subsystem to the processors 126, 127 before the system 100 is sufficiently initialized, the interrupts cannot be serviced through the dedicated RAID SIO.A 153. Therefore, the interrupts must initially bypass the SIO.A 153, and must be serviced through the Motherboard SIO.A 296. This is accomplished by initially setting the interrupt configuration signal (INT_CFG 283) at a logic "0" by switching the switch SW1. The switch SW1 may be switched either manually, or under software control. Switching SW1 will mask interrupts going to the SIO.A 153. The output of the mux 277, as well as the three other interrupt lines 272, 271, 270, from the SCSI Controller B 132, the SCSI Controller C 281, and the XOR controller 151, are connected respectively to the inverting inputs of the NAND gates 288, 287, 286, 285, 284. The non-inverting inputs of the NAND gates 288, 287, 286, 285, 284 are connected to the INTR_CFG signal 283, which, when set to a "0" level by the SW1, will force the outputs of the NAND gates 288, 287, 286, 285, 284 high, thereby masking the interrupts from the SIO.A chip 153. Thus, the SIO.A 153, which normally detects interrupts and sends them to the CPU1 126 and the CPU2 127 over the APIC bus 298, is prevented from doing so. Instead, the interrupts are routed to the CPU1 126 and the CPU2 127 through the Motherboard SIO.A 296. This is achieved by having the interrupt signals 269, 272, 271, 270 logically ORed together by the NOR gate 289, and, after passing through the NAND gate 290, the logical result is provided to the IRQ input of the MB SIO.A 296. When the MB SIO.A 296 receives an interrupt, it generates an interrupt on the line INT_MB 297 to the CPU1 126 and the CPU2 127. The processor to which the interrupt was directed then queries the Motherboard SIO.A 296 through the processor-to-motherboardPCI bridge 295 to determine who generated the interrupt.

Once the system 100 has initialized sufficiently to operate in multiprocessor mode, the switch SW1 is switched to VCC, thereby holding INTR_CFG high (i.e., at a logical "1"). This enables the interrupts from the mux 277, the SCSI Controller B 132, the SCSI Controller C 133 and the XOR controller 151, by allowing them to pass through the respective NAND gates 288, 287, 286, 285, 284 to the SIO.A 153 and to the full-RAID upgrade microcontroller 251, if the full-RAID upgrade card 250 is in place. In addition, the interrupt generated through the NOR gate 289 and then through the NAND gate 290 to the motherboard SIO.A 296 is forced to the inactive state (i.e., at logical "1"). When the SIO.A chip 153 detects an interrupt, it then informs the CPU1 126 and the CPU2 127 over the APIC bus 298 which interrupts were received.

Figure 8A:
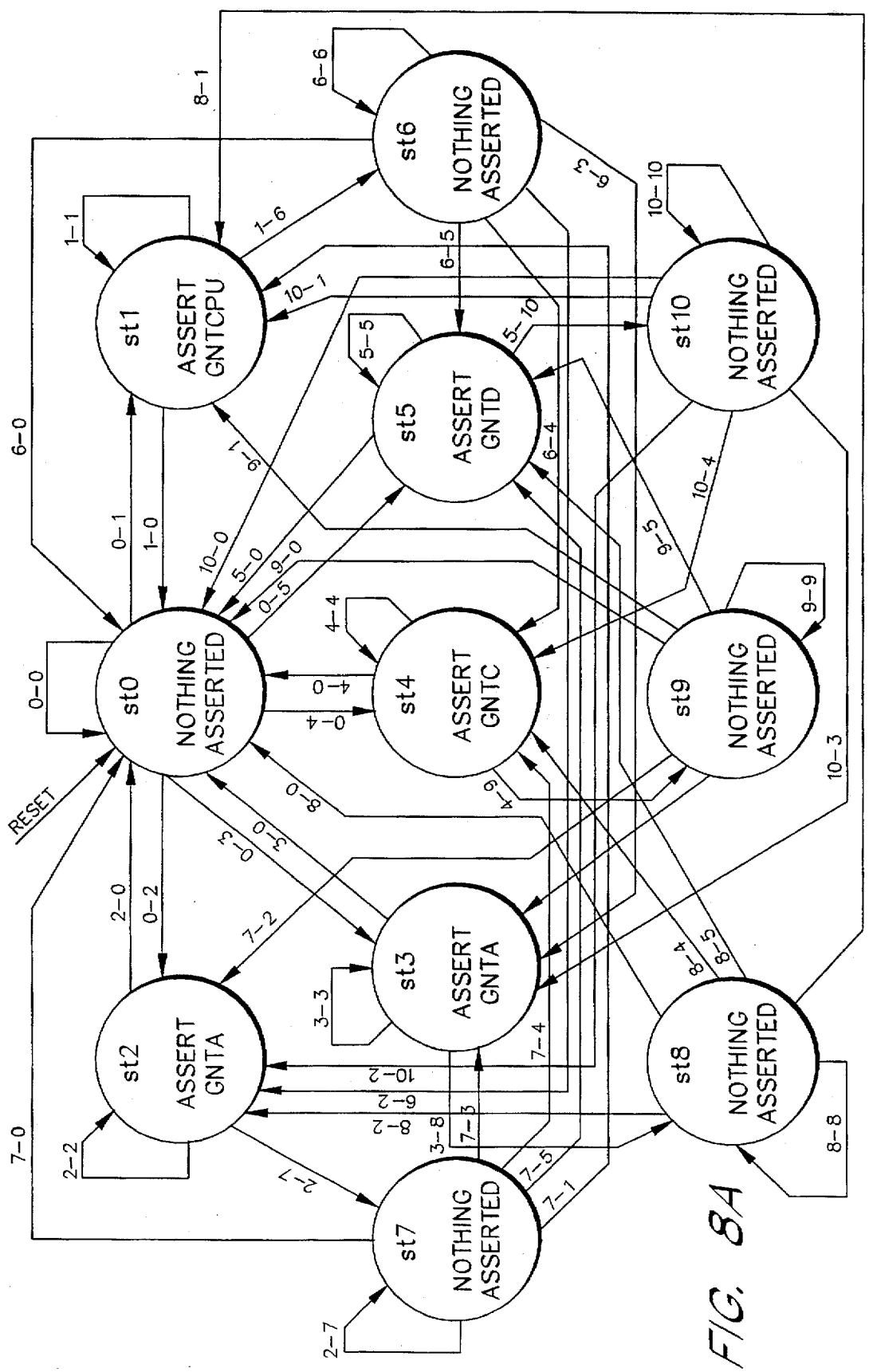
FIG. 8A is a state diagram illustrating the operation of the SCB Arbiter.

FIG. 5, FIG. 8 and Appendix A illustrate the SCB arbitration circuit 202 of the present invention. The SCB bus request signals from the full-RAID upgrade connector 135 (Sybreqcpu), from each of the SCSI controllers 131, 132, 133 (Sybreqa, Sybreqb, Sybreqc), and from the XOR controller 151 (Sybreqd), are connected to the SCB Arbiter 202. Additionally, a Sylockcpu signal 204 from the full-RAID upgrade connector 138 is connected to the SCB Arbiter 202.

The SCB arbitration circuitry 202 is a state machine which implements an arbitration algorithm. With reference to the state equations in Appendix A, the state diagram illustrated in FIG. 8A and the state machine transitions identified in FIGS. 8A and 8B, the state machine starts in a State 0 (st0). If no SCB bus requests are received, then the state machine remains in the State 0, and no SCB bus grant is asserted. If, while in the State 0, an SCB bus request is received from any device, then the state machine 202 will transition to either a State 1 (st1), a State 2 (st2), a State 3 (st3), a State 4 (st4) or a State 5 (st5), wherein an SCB bus grant will be asserted to one of the requesting devices. In the State 0, the state machine arbitrates priority between the requesting devices in descending order as follows: the full-RAID microcontroller 251 has the highest priority, the SCSI Controller A 131 has the next higher priority, followed in order by the SCSI Controller B 132, the SCSI Controller C 133 and the XOR controller 151. Thus, if the full-RAID microcontroller 251 asserts an SCB bus request (Sybreqcpu), the state machine 202 will transition to the State 1, and will assert an SCB bus grant (Gntcpu) to the microcontroller 251. The state machine transitions are identified in FIG. 8A with a first number indicating the state before the transition and the second number indicating the state after the transition. For example, the transition 0-1 indicates a transition from the State 0 to the State 1. The conditions which cause the transitions are tabulated in FIGS. 8B and 8C.

The state machine 202 will remain in the State 1, and continue to assert the SCB bus grant (Gntcpu) to the microcontroller 251, if the microcontroller 251 asserts both the SCB bus request (Sybreqcpu) and the Sylockcpu signal, or if the microcontroller 251 continues to assert the SCB bus request (Sybreqcpu) and no other device requests the SCB bus 150. If the microcontroller 251 continues to assert an SCB bus request (Sybreqcpu) and the Sylockcpu signal is deasserted, then the state machine 202 will transition to a State 6 (st6). Otherwise, if the microcontroller 251 deasserts its SCB bus request (Sybreqcpu), then the state machine 202 will transition back to the State 0, and will await another SCB bus request. If the state machine 202 does transition to the State 6, the SCB bus grant (Gntcpu) to the microcontroller 251 will be deasserted. However no SCB bus grant will be given to any other requesting device, so long as the microcontroller 251 continues to assert an SCB bus request (Sybreqcpu).

When the microcontroller 251 deasserts its SCB bus request (Sybreqcpu) while the state machine 202 is in the State 6, and at least one device requests the SCB bus 150, the state machine 202 will transition to either the State 2, the State 3, the State 4, or the State 5, wherein an SCB bus grant will be asserted to one the requesting device which has priority. When in the State 6, the state machine arbitrates priority in the following descending order: the SCSI Controller A 131, the SCSI Controller B 132, the SCSI Controller C 133, the XOR controller 151. Thus, if the SCSI Controller A 131 asserts an SCB bus request while the state machine is in the State 6, the state machine 202 will go to the State 2 and will assert an SCB bus grant (Gnta) to the SCSI Controller A 131. The state machine 202 will remain in the State 2, and continue to assert the SCB bus grant (Sybreqa) to the SCSI Controller A 131, as long as the SCSI Controller A 131 asserts its SCB bus request (Sybreqa) and no other device requests the SCB bus 150. If the SCSI Controller A 131 continues to assert its SCB bus request (Sybreqa) and another device also asserts an SCB bus request while the state machine 202 is in the State 2, then the state machine 202 will transition to a State 7 (st7). Otherwise, if the SCSI Controller A 131 deasserts its SCB bus request (Sybreqa), the state machine 202 will transition back to the State 0, and await another bus request. If the state machine 202 does transition to the State 7, the SCB bus grant (Gntb) to the SCSI Controller A 131 will be deasserted. However no SCB bus grant will be given to any other requesting device as long as the SCSI Controller A 131 continues to assert its SCB bus request (Sybreqa). Once the SCSI Controller A 131 deasserts its SCB bus request (Sybreqa) while the state machine 202 is in the State 7, and at least one device requests the SCB bus, the state machine 202 will transition to either the State 1, the State 3, the State 4, or the State 5, wherein a bus grant will be asserted to the requesting device having the highest priority. While in the State 7, the state machine 202 arbitrates priority in descending order as follows: the SCSI Controller B 132, the SCSI Controller C 133, the XOR controller 151, the microcontroller 251 or the SCSI Controller A 131. Thus, as the SCB Arbiter 202 receives bus requests from the devices, the state machine 202 rotates the order of priority, first giving highest priority to the microcontroller 251, then to the SCSI Controller A 131, then to the SCSI Controller B 132, and so on, so that no device will monopolize the SCB bus 150 and so that every device will be granted access to the SCB bus 150.

The preceding description of the SCB Arbiter 202 is illustrative of the SCB Arbiter 202 operation. As will be readily apparent from the state equations in Appendix A and from the state diagram of FIG. 8A and the state transition conditions of FIGS. 8B and 8C, the state machine 202 will transition through a State 8, a State 9 and a State 10 in a similar manner in accordance with the device bus requests received by the SCB Arbiter 202 and in accordance with the priority established by the state machine 202 at each of the states.

With reference to FIG. 6, the PCI bus 130 arbitration is handled by the SIO.A chip 153 (e.g., Intel S82379). PCI bus arbitration is well known and provided by any number of parts, such as, for example, an Intel S82379AB. However, because the Intel S82379AB SIO.A chip used in the preferred embodiment can only arbitrate five PCI bus requests, and the architecture of the present invention requires up to six PCI bus requests (from the SCSI Controller A 131, the SCSI Controller B 132, the SCSI Controller C 133, the full-RAID microcontroller 251, the XOR controller 151, and the processor-to-PCI bridge 129), the preferred embodiment includes the PCI arbiter logic 175 which arbitrates PCI bus requests from the XOR controller 151 and the full-RAID microcontroller 251 when the full-RAID upgrade card 200 is inserted into the full-RAID upgrade connector 138. The arbitration scheme is similar to that of the SCB Arbiter 202. The first device requesting the PCI bus 130 will win the arbitration. If the next PCI bus request is contested by the XOR controller 151 and the full-RAID microcontroller 251, whichever device was last given the PCI bus, will lose the arbitration. This assures that no one device can monopolize the PCI bus 130. The winner of the arbitration will have its bus request routed to the SIO.A 153, which will then arbitrate between the winner of the preceding PCI arbitration and the remaining devices.

The RAID subsystem 134 can be upgraded from hardware-assisted RAID to full-RAID by the insertion of the full-RAID upgrade card 200 into the full-RAID upgrade connector 138. As shown in FIG. 7, the full-RAID upgrade card incorporates an intelligent controller 251, such as an Intel i960, which manages the allocations of disk requests to the SCSI drives. The upgrade card 200 permits the RAID subsystem 134 to be upgraded at any time from hardware-assisted RAID to full-RAID by simply plugging the upgrade card 200 into the upgrade connector 138. Thus, as a user's performance requirements increase, the user can upgrade the file server incrementally, rather than having to purchase an entire new RAID subsystem, as would be required with existing file server systems using a RAID subsystem.

The BIOS EEPROM 253 of the microcontroller 251 contains boot-up information and low-level commands. The microcontroller RAM 252 is used as a scratchpad memory by the microcontroller 251. The PCI-to-microcontroller bridge 129 couples the microcontroller bus 258 to the RAID subsystem PCI bus 138.

When the full-RAID upgrade card 200 is installed, it handles management of the RAID-subsystem 134 so that the CPU1 126 and the CPU2 127 are freed of managing this task. When either the CPU1 126 or the CPU2 127 sends a read or write command over the local-PCI bus 130, the command is passed through the microcontroller-to-PCI bridge 254 to the microcontroller 251. The microcontroller 251 then allocates the read or write commands to the appropriate SCSI controller.

As shown in FIG. 4, the microcontroller 251 receives and services interrupts from the SCSI Controller A 131, the SCSI Controller B 132, the SCSI Controller C 133, and the XOR controller 151 after they pass through respective NAND gates 287, 286, 285, 284. This relieves the CPU1 126 and the CPU2 127 of the burden of servicing the numerous interrupts generated during the transfer of data to and from the RAID subsystem, as discussed above. The microcontroller 251 generates an interrupt on the line 274, through interrupt circuitry, to the CPU1 126, and the CPU2 127, only upon completion of the entire read or write command.

The device drivers, however, must determine if the full-RAID upgrade card is present, so the device drivers can configure itself to operate with a full-RAID architecture rather than operate with a hardware-assisted RAID architecture. This is accomplished by loading the SCSI Controller A 131, the SCSI Controller B 132, the SCSI Controller C 133 with a configuration ID, which can be read by the operating system drivers, indicating whether the RAID subsystem 134 is acting as a hardware-assisted or as a full-RAID subsystem. As shown in FIG. 6, there are first and second IDs, representing respectively, hardware-assisted RAID and full-RAID. The ID selection is controlled by the PRESENT* line 275 connected to the full RAID upgrade connector 138 and to the pull-up resistor 276. When the full-RAID upgrade card 200 is not inserted into the full-RAID upgrade connector 138, the PRESENT* line 275 will be pulled high by the pull-up resistor 276, thereby selecting the hardware-assisted RAID ID to be loaded into the SCSI controllers 131, 132, 133. When the full-RAID upgrade card 200 is inserted into the full-RAID upgrade connector 138, the PRESENT* line 275 will be pulled low by the upgrade card 200, thereby selecting the full-RAID ID to be loaded into the SCSI controllers 131, 132, 133.

The implementation described for improving the interface to a RAID architecture for a file server system has been presented by way of example only, and not limitation. Thus, the breadth and scope of the present invention should not be limited by any of the above-described exemplary embodiments, but should be defined only in accordance with the following claims and their equivalents.

APPENDIX A

SCB ARBITER EQUATIONS

```
       SUBDESIGN scbarb
5      (
           clk        :   INPUT;
           reset      :   INPUT;
           breqa      :   INPUT;
           breqb      :   INPUT;
10         breqc      :   INPUT;
           breqd      :   INPUT;
           breqcpu    :   INPUT;
           lockcpu    :   INPUT;
           gnta       :   OUTPUT;
15         gntb       :   OUTPUT;
           gntc       :   OUTPUT;
           gntd       :   OUTPUT;
           gntcpu     :   OUTPUT;
       )
20     VARIABLE
           ss: MACHINE WITH STATES (st0 = B"00000000001",
                                    st1 = B"00000000010",
                                    st2 = B"00000000100",
                                    st3 = B"00000001000",
25                                  st4 = B"00000010000",
                                    st5 = B"00000100000",
                                    st6 = B"00001000000",
                                    st7 = B"00010000000",
                                    st8 = B"00100000000",
30                                  st9 = B"01000000000",
                                    st10= B"10000000000");
```

-21-

APPENDIX A (Cont.)

```
        sybreqa       : DFF:
        sybreqb       : DFF;
        sybreqc       : DFF;
        sybreqd       : DFF;
        sybreqcpu     : DFF;
        sylockcpu     : DFF;
BEGIN
DEFAULTS
        gnta = VCC:
        gntb = VCC;
        gntc = VCC;
        gntd = VCC;
        gntcpu = VCC;
END DEFAULTS;

sybreqa.clk      =    clk;
        sybreqb.clk      =    clk;
        sybreqc.clk      =    clk;
        sybreqd.clk      =    clk;
        sybreqcpu.clk    =    clk;
        sylockcpu.clk    =    clk;
        sybreqa.d        =    breqa;
        sybreqb.d        =    breqb;
        sybreqc.d        =    breqc;
        sybreqd.d        =    breqd;
        sybreqcpu.d      =    breqcpu;
        sylockcpu.d      =    lockcpu;
        ss.clk           =    clk;
        ss.reset         =    reset;
```

-22-

APPENDIX A (Cont.)

```
CASE ss IS
    WHEN st0 =>
        IF !sybreqcpu THEN
            ss = st1;
        ELSIF !sybreqa THEN
            ss = st2;
        ELSIF !sybreqb THEN
            ss = st3;
        ELSIF !sybreqc THEN
            ss = st4
        ELSIF !sybreqd THEN
            ss = st5;
        END IF;
    WHEN st1 =>
        gntcpu = GND
        IF (!sybreqcpu & sybreqa & sybreqb & sybreqc & sybreqd)
            # (!sybreqcpu & !sylockcpu) THEN
                ss = st1;
        ELSIF ((!sybreqa # !sybreqb # !sybreqc # !sybreqd) & sylockcpu) THEN
                ss = sT6;
        ELSE ss = st0;
        END IF;
    WHEN st2 =>
        gnta = GND;
        IF (!sybreqa & sybreqcpu & sybreqb & sybreqc & sybreqd) THEN
                ss = st2;
        ELSIF (!sybreqcpu # !sybreqb # !sybreqc # !sybreqd) THEN
                ss = st7;
        ELSE ss = st0;
        END IF;
```

-23-

APPENDIX A (Cont.)

```
WHEN st3 =>
        gntb = GND;
        IF (!sybreqb & sybreqcpu & sybreqa & sybreqc & sybreqd) THEN
                ss = st3;
        ELSIF (!sybreqcpu # !sybreqa # !sybreqc # !sybreqd) THEN
                ss = st8;
        ELSE ss = st0;
        END IF;
WHEN st4 =>
        gntc = GND;
        IF (!sybreqc & sybreqcpu & sybreqa & sybreqb & sybreqd) THEN
                ss = st4;
        ELSIF (!sybreqcpu # !sybreqa # !sybreqb # !sybreqd) THEN
                ss = st9;
        ELSE ss = st0;
        END IF;
WHEN st5 =>
        gntd = GND;
        IF (!sybreqd & sybreqcpu & sybreqa & sybreqb & sybreqc) THEN
                ss = st5;
        ELSIF (!sybreqcpu # !sybreqa # !sybreqb # !sybreqc) THEN
                ss = st10;
        ELSE ss = st0;
        END IF;
WHEN st6 =>
        IF !sybreqcpu THEN
                ss = st6;
        ELSIF (sybreqcpu & !sybreqa) THEN
                ss = st2;
```

APPENDIX A (Cont.)

```
            ELSIF (sybreqcpu & sybreqa & !sybreqb) THEN
                    ss = st3;
            ELSIF (sybreqcpu & sybreqa & sybreqb & !sybreqc) THEN
                    ss = st4;
            ELSIF (sybreqcpu & sybreqa & sybreqb & sybreqc & !sybreqd) THEN
                    ss = st5;
            ELSE ss = st0;
            END IF;
        WHEN st7 =>
            IF !sybreqa THEN
                    ss = st7;
            ELSIF (sybreqa & !sybreqb) THEN
                    ss = st3;
            ELSIF (sybreqa & sybreqb & !sybreqc) THEN
                    ss = st4;
            ELSIF (sybreqa & sybreqb & sybreqc & !sybreqd) THEN
                    ss = st5;
            ELSIF (sybreqa & sybreqb & sybreqc & sybreqd & !sybreqcpu) THEN
                    ss = st1;
            ELSE ss = st0
            END IF;
        WHEN st8 =>
            IF !sybreqb THEN
                    ss = st8;
            ELSIF (sybreqb & !sybreqc) THEN
                    ss = st4;
            ELSIF (sybreqb & sybreqc & !sybreqd) THEN
                    ss = st5;
            ELSIF (sybreqb & sybreqc & sybreqd & !sybreqcpu) THEN
                    ss = st1;
```

APPENDIX A (Cont.)

```
        ELSIF (sybreqb & sybreqc & sybreqd & sybreqcpu & !sybreqa) THEN
                ss = st2;
        ELSE ss = st0;
        END IF;
    WHEN st9 = >
        IF !sybreqc THEN
                ss = st9;
        ELSIF (sybreqc & !sybreqd) THEN
                ss = st5;
        ELSIF (sybreqc & sybreqd & !sybreqcpu) THEN
                ss = st1;
        ELSIF (sybreqc & sybreqd & sybreqcpu & !sybreqa) THEN
                ss = st2;
        ELSIF (sybreqc & sybreqd & sybreqcpu & sybreqa & !sybreqb) THEN
                ss = st3;
        ELSE ss = st0;
        END IF;
    WHEN st10 = >
        IF !sybreqd THEN
                ss = st10;
        ELSIF (sybreqd & !sybreqcpu) THEN
                ss = st1;
        ELSIF (sybreqd & sybreqcpu & !sybreqa THEN
                ss = st2;
        ELSIF (sybreqd & sybreqcpu & sybreqa & !sybreqb) THEN
                ss = st3;
        ELSIF (sybreqd & sybreqcpu & sybreqa & sybreqb & !sybreqc) THEN
                ss = st4;
```

APPENDIX A (Cont.)

```
        ELSE ss = st0;
            END IF;
    END CASE;
    END;
```

What is claimed is:

1. A file server system which provides increased bandwidth between a processor, a memory and a redundant array of inexpensive disks (RAID) subsystem, said file server system comprising:
   a processor connected to a processor bus;
   a peripheral bus coupled to said processor bus by a first bridging circuit, said peripheral bus connected only to non-RAID devices;
   a first array of disks;
   a first disk controller for controlling said first array of disks;
   a second array of disks;
   a second disk controller for controlling said second array of disks;
   a memory for storing commands for said first disk controller and said second disk controller;
   an arbiter which arbitrates access requests to said memory from at least said first disk controller and said second disk controller;
   a local RAID bus, said local RAID bus coupled to said first disk controller and said second disk controller; and
   a second bridging circuit, said second bridging circuit coupling said local RAID bus to said processor bus independent of said first bridging circuit.

2. The file server system as defined in claim 1, wherein said peripheral bus and said local RAID bus are PCI buses.

3. The file server as defined in claim 1, wherein said first disk controller is a SCSI disk controller.

4. The file server as defined in claim 1, wherein said processor is a microprocessor.

5. The file server as defined in claim 1, wherein said RAID subsystem is a hardware-assisted RAID implementation which is upgradeable to full-RAID, said file server further comprising:
   a full-RAID upgrade connector connected to said local RAID bus; and
   an upgrade controller board, inserted into said upgrade connector, said upgrade controller board cooperating with said RAID subsystem to provide a full-RAID subsystem.

6. A file server which is upgradeable from a hardware-assist implementation of a redundant array of inexpensive disks (RAID) subsystem to a full-RAID implementation of RAID, said file server comprising:
   a processor bus;
   a processor connected to said processor bus;
   an array of disks;
   a disk controller which controls said array of disks;
   a first peripheral bus coupled to said disk controller;
   a first bridging circuit which couples said first peripheral bus to said processor bus;
   a full-RAID upgrade connector connected to said first peripheral bus;
   a full-RAID upgrade controller board, inserted into said upgrade connector, said upgrade controller board cooperating with said RAID subsystem to provide a full-RAID subsystem; and
   a configuration identifier loadable into said disk controller, said configuration identifier indicating if said RAID subsystem is to be operated as a full-RAID subsystem.

7. The file server as defined in claim 6, wherein said first peripheral bus is a PCI bus.

8. The file server as defined in claim 6, wherein said disk controller is a SCSI disk controller.

9. The file server as defined in claim 6, further comprising:
   a second peripheral bus;
   a second bridging circuit, said second bridging circuit coupling said second peripheral bus to said processor bus, said second peripheral bus and said second bridging circuit operating independently of said first peripheral bus and said first bridging circuit.

10. A method for providing increased bandwidth between a processor, a memory, and a RAID subsystem in a file server system, said method comprising the steps of:
    coupling a processor to a processor bus;
    coupling said processor bus to a peripheral bus via a first bridging circuit;
    coupling a first array of disks to a first disk controller;
    coupling a second array of disks to a second disk controller;
    coupling a local RAID bus to said first disk controller and said second disk controller;
    storing command data in a memory;
    arbitrating requests to access said memory to retrieve at least a portion of said command data from said first disk controller and said second disk controller; and
    coupling said local RAID bus to said processor bus via a second bridging circuit independent of said first bridging circuit.

11. A file server system which provides increased bandwidth between a processor, a memory and a redundant array of inexpensive disks (RAID) subsystem, said file server system comprising:
    a processor connected to a processor bus;
    a first PCI bus coupled to said processor bus by a first bridging circuit, said first PCI bus coupled to at least one I/O device;
    an array of disks;
    a least one disk controller for controlling said array of disks;
    a second PCI bus dedicated to said RAID subsystem, said second PCI bus coupled to said disk controller; and
    a second bridging circuit, said second bridging circuit coupling said second PCI bus to said processor bus independent of said first bridging circuit.

12. A method for providing increased bandwidth between a processor, a memory, and a RAID subsystem in a file server system, said method comprising the steps of:
    coupling a processor to a processor bus;
    coupling said processor bus to a first peripheral bus via a first bridging circuit;
    coupling an array of disks to a disk controller;
    coupling a second peripheral bus reserved for said RAID subsystem to said disk controller; and
    coupling said second peripheral bus to said processor bus via a second bridging circuit independent of said first bridging circuit.

* * * * *